United States Patent
Banka et al.

(10) Patent No.: US 10,116,587 B2
(45) Date of Patent: Oct. 30, 2018

(54) ELECTRONIC DISTRIBUTION OF APPLICATIONS HAVING MULTIPLE SERVICE LEVELS

(71) Applicant: Microsoft Technology Licensing, LLC, Redmond, WA (US)

(72) Inventors: Anjali Banka, Reston, VA (US); Brett Peters, Southborough, MA (US); Heng Ji, Woburn, MA (US); Jeffrey Lee James, Bothell, WA (US); Mochi Li, Kirkland, WA (US); Timothy Eshelman, Arlington, MA (US); Matthew Kotler, Sammamish, WA (US); Pablo Martins, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 149 days.

(21) Appl. No.: 15/159,785

(22) Filed: May 19, 2016

(65) Prior Publication Data

US 2017/0339066 A1   Nov. 23, 2017

(51) Int. Cl.
*H04L 12/927* (2013.01)
*G06F 15/16* (2006.01)
(Continued)

(52) U.S. Cl.
CPC ......... *H04L 47/803* (2013.01); *G06Q 20/401* (2013.01); *H04L 61/1511* (2013.01);
(Continued)

(58) Field of Classification Search
USPC ........ 709/225, 223, 224, 229, 203, 219, 218
See application file for complete search history.

(56) References Cited

U.S. PATENT DOCUMENTS

| | | | |
|---|---|---|---|
| 8,051,057 B2 * | 11/2011 | Abu-Hakima | .... G06F 17/30864 455/466 |
| 8,196,210 B2 | 6/2012 | Sterin | |

(Continued)

FOREIGN PATENT DOCUMENTS

WO    2006041591 A2    4/2006

OTHER PUBLICATIONS

Barnwell, Nick, "Set up your Office 365 and Azure AD tenant", Published on: Apr. 30, 2015 Available at: http://blogs.msdn.com/b/onenotedev/archive/2015/04/30/set-up-your-azure-office-365-tenant.aspx.

(Continued)

*Primary Examiner* — Jude Jean Gilles
(74) *Attorney, Agent, or Firm* — Law Offices of Richard Chi; Richard Chi (57) ABSTRACT

Techniques for electronic distribution of software applications to users and devices belonging to a single network domain, wherein such applications are configurable to provide multiple service levels. In an aspect, a first service level is provided to users and/or devices sharing the same network domain. Upon request by an admin of the network domain, an application control server verifies the admin's control of the domain, as well as fulfillment of conditions for accessing a second service level. Upon verification of control and fulfillment, the application control server allows access by the admin to an admin portal. The application control server further reassigns the service level of users and/or devices sharing the network domain from the first service level to the second service level.

20 Claims, 8 Drawing Sheets

(51) Int. Cl.
*G06Q 20/40* (2012.01)
*H04L 29/08* (2006.01)
*H04L 29/12* (2006.01)

(52) U.S. Cl.
CPC ............ *H04L 67/02* (2013.01); *H04L 67/306* (2013.01); *H04L 67/34* (2013.01)

(56) References Cited

U.S. PATENT DOCUMENTS

| | | | | |
|---|---|---|---|---|
| 9,756,397 B1* | 9/2017 | Bonomi | ............. | H04N 21/4854 |
| 2009/0192842 A1* | 7/2009 | Grabarnik | .............. | G06Q 10/06 705/7.27 |
| 2012/0089726 A1* | 4/2012 | Doddavula | ........... | G06F 9/5072 709/224 |
| 2014/0101225 A1* | 4/2014 | Abu-Libdeh | ....... | H04L 41/5096 709/203 |
| 2014/0136690 A1* | 5/2014 | Jain | ..................... | H04L 41/0826 709/224 |
| 2015/0073936 A1* | 3/2015 | Peterson | ............ | G06Q 30/0639 705/26.9 |
| 2017/0104640 A1* | 4/2017 | Jain | ..................... | H04L 41/5022 |

OTHER PUBLICATIONS

"Buy a subscription to Office 365 for business from your free trial", Retrieved on: Feb. 9, 2016 Available at: https://support.office.com/en-us/article/Buy-a-subscription-to-Office-365-for-business-from-your-free-trial-485fee6d-b22e-440a-9053-a4e7fa509c92.

"Here's What You Get When You Subscribe", Retrieved on: Feb. 9, 2016 Available at: http://www.autodesk.com/subscription.

"About the Office 365 admin center", Published on: Feb. 3, 2016 Available at: https://support.office.com/en-us/article/About-the-Office-365-admin-center-58537702-d421-4d02-8141-e128e3703547.

"Microsoft Licensing Bootcamp", Published on: Oct. 15, 2015 Available at: http://www.microsoftlicensereview.com/.

"Software License Optimization", Published on: Sep. 23, 2014 Available at: http://www.flexerasoftware.com/enterprise/products/software-license-management/.

* cited by examiner

ELECTRONIC DISTRIBUTION OF APPLICATIONS HAVING MULTIPLE SERVICE LEVELS

BACKGROUND

The Internet has become an important platform for the distribution of software applications for today's electronic devices. In one increasingly prevalent model, a software application such as a game application or business productivity suite is electronically transmitted to an individual user's device, and the user is granted access to a subset of the application's services for no fee. Such a subset may also be denoted the "freemium" services, and may be considered a first service level of the application.

Thereafter, if the user decides to purchase the software application, then payment may be made, and access may be granted to the full features of the application, i.e., the "premium" services, which may be considered a second service level of the application. This distribution model advantageously allows users to sample certain features of software applications before deciding to purchase the full version, and further allows software application owners to increase the visibility and facilitate the distribution of their products.

DETAILED DESCRIPTION

Certain technical challenges arise when applying the aforementioned software application distribution model to organizations or "tenants" having hundreds or even thousands of members. In particular, it is challenging for administrators of such organizations to keep track of and coordinate the application service level that is assigned to each member. It is also challenging for administrators to reassign service levels to members when it is desired to upgrade the service level for the entire organization.

Accordingly, it would be desirable to provide tools and techniques to electronically distribute software applications having multiple service levels to an organization, and to facilitate the assignment of service levels to members of the organization. Various aspects of the technology described herein are generally directed towards techniques for a system that facilitates electronic distribution of third-party-developed software applications to devices and users in an organization.

The detailed description set forth below in connection with the appended drawings is intended as a description of exemplary means "serving as an example, instance, or illustration," and should not necessarily be construed as preferred or advantageous over other exemplary aspects. The detailed description includes specific details for the purpose of providing a thorough understanding of the exemplary aspects of the invention. It will be apparent to those skilled in the art that the exemplary aspects of the invention may be practiced without these specific details. In some instances, well-known structures and devices are shown in block diagram form in order to avoid obscuring the novelty of the exemplary aspects presented herein.

Figure 1:
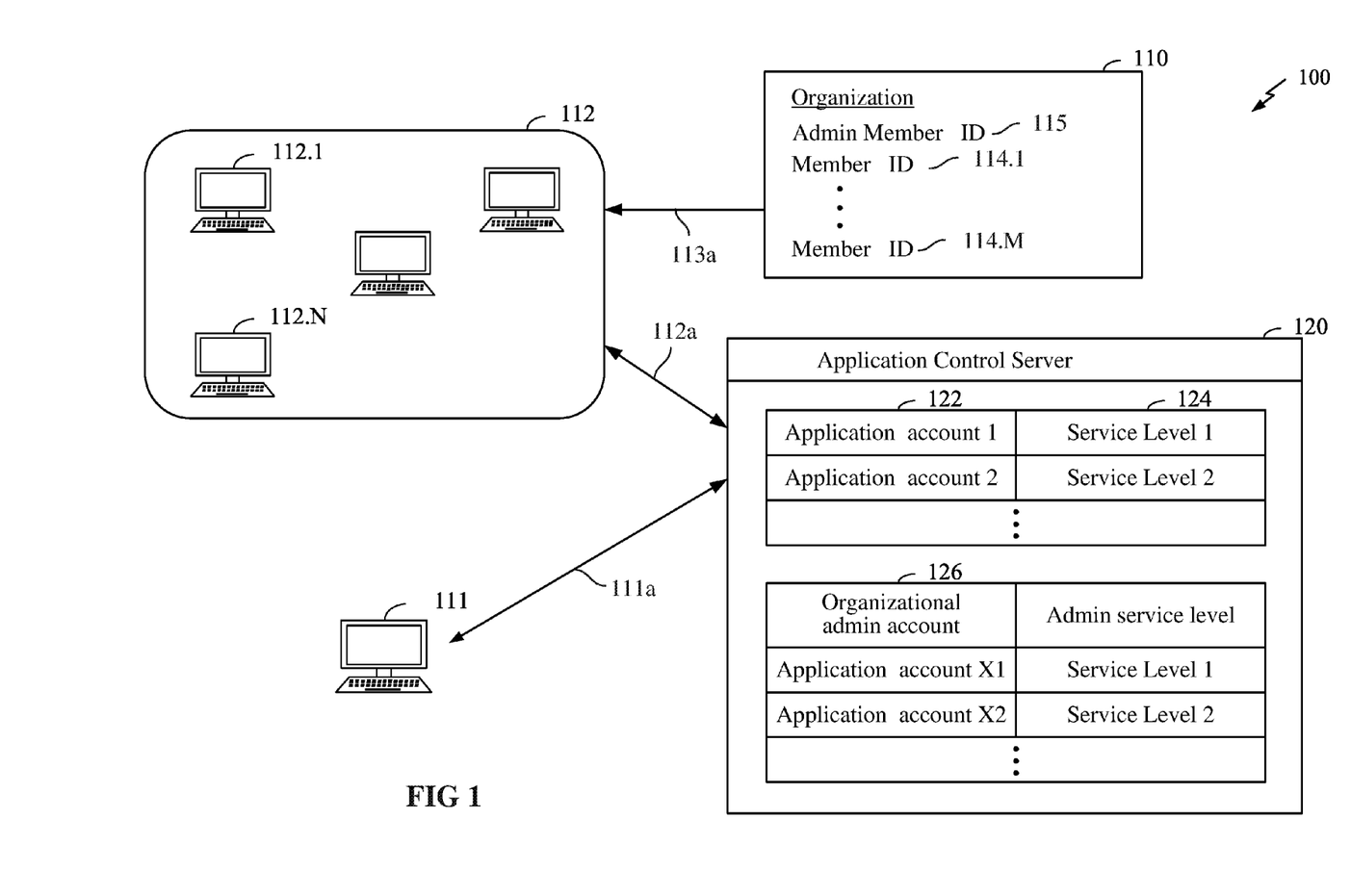
FIG. 1 illustrates a scenario wherein techniques of the present disclosure may be applied.

FIG. 1 illustrates a scenario 100 wherein techniques of the present disclosure may be applied. Note FIG. 1 is shown for illustrative purposes only, and is not meant to limit the scope of the present disclosure.

In FIG. 1, device 111 may correspond to, e.g., a personal computer such as desktop or laptop computer, smartphone, tablet, and/or generally any device type that can support the techniques described hereinbelow. Device 111 may be configured to execute one or more software applications providing functionality and/or services (herein denoted "application services") to a user of the device. Such applications services may include, e.g., business productivity services such as word processing, spreadsheet, email processing, etc. Alternatively, software applications supported by the present disclosure may also include game, academic, technical, or other applications. Note the exemplary applications are described here for illustrative purposes only, and are not meant to limit the scope of the present disclosure to any particular types of software applications.

For certain software applications, use of application services on device 111 may be at least partially controlled by an application owner through application server 120. Such control may include, e.g., the ability to grant or deny the use of certain features of the application locally on device 111. In an exemplary embodiment, server 120 may control the provision of application services over communication link 111a between device 111 and server 120, which may be conducted over, e.g., a wired or wireless Internet connection. Note the application owner may correspond to, e.g., a developer of the software application, distributor, seller, or any party which can grant or deny access to the application services.

In an exemplary embodiment, an application may be configured to provide different levels of service to users of device 111, according to certain service conditions as specified by application server 120. For example, taking an illustrative example of a word processing application, a first level of application services (or "first service level") may include, e.g., use of the word processing functionality for documents up to a certain page limit, e.g., 50 pages, while a second service level may allow for, e.g., processing documents with no page limit, etc. Alternatively, a game application may offer a first service level that includes a first collection of game "levels" or features, while a second service level may offer a second, larger collection of game levels or features, etc. Service levels may further or alternatively be differentiated based on factors such as duration of access, total number of devices, users, or accounts to which services are provided, different subsets of application features included, etc. Note these specific applications and service levels are described for illustrative purposes only, and are not meant to limit the scope of the present disclosure.

An application owner may specify that different service levels are provided to different users based on fulfillment of certain conditions by the user, e.g., acceptance of certain license terms, including payment according to a fee or fee schedule for use of the requested services. For example, a set of conditions for a given service level may be detailed in a license agreement to be accepted by the user as a condition for using the application on the device. For example, the application owner may require the user to pay a one-time fee, or ongoing subscription fees, etc., to use application's services.

In an exemplary embodiment, the user is required by server 120 to create (or use a pre-existing) application-specific account (or "application account"), to which a particular service level is then assigned by server 120. For example, as indicated in columns 122, 124 in FIG. 1, application account 1 may be assigned service level 1, application account 2 may be assigned service level 2, etc.

In an exemplary embodiment, an application account may be assigned a service level known as "freemium" service, which may be offered according to certain service conditions also denoted "freemium conditions." Such conditions may specify that the user of an application account may access some or all features of the application for free, e.g., at no charge, while also having the option to upgrade to a higher service level, also known as a "premium" service, based on fulfillment of certain additional conditions, or "premium conditions." In an exemplary embodiment, the premium conditions may be as prescribed by, e.g., the application owner. An application account assigned freemium services is also denoted a "freemium account" herein, and likewise for other levels of service (e.g., "premium account," etc.).

When a user agrees to and fulfills the premium conditions, the corresponding application account may be assigned a premium service level, enabling the user to access premium services. In an exemplary embodiment, premium conditions may specify, e.g., payment of a fixed or recurring fee.

Figure 2:
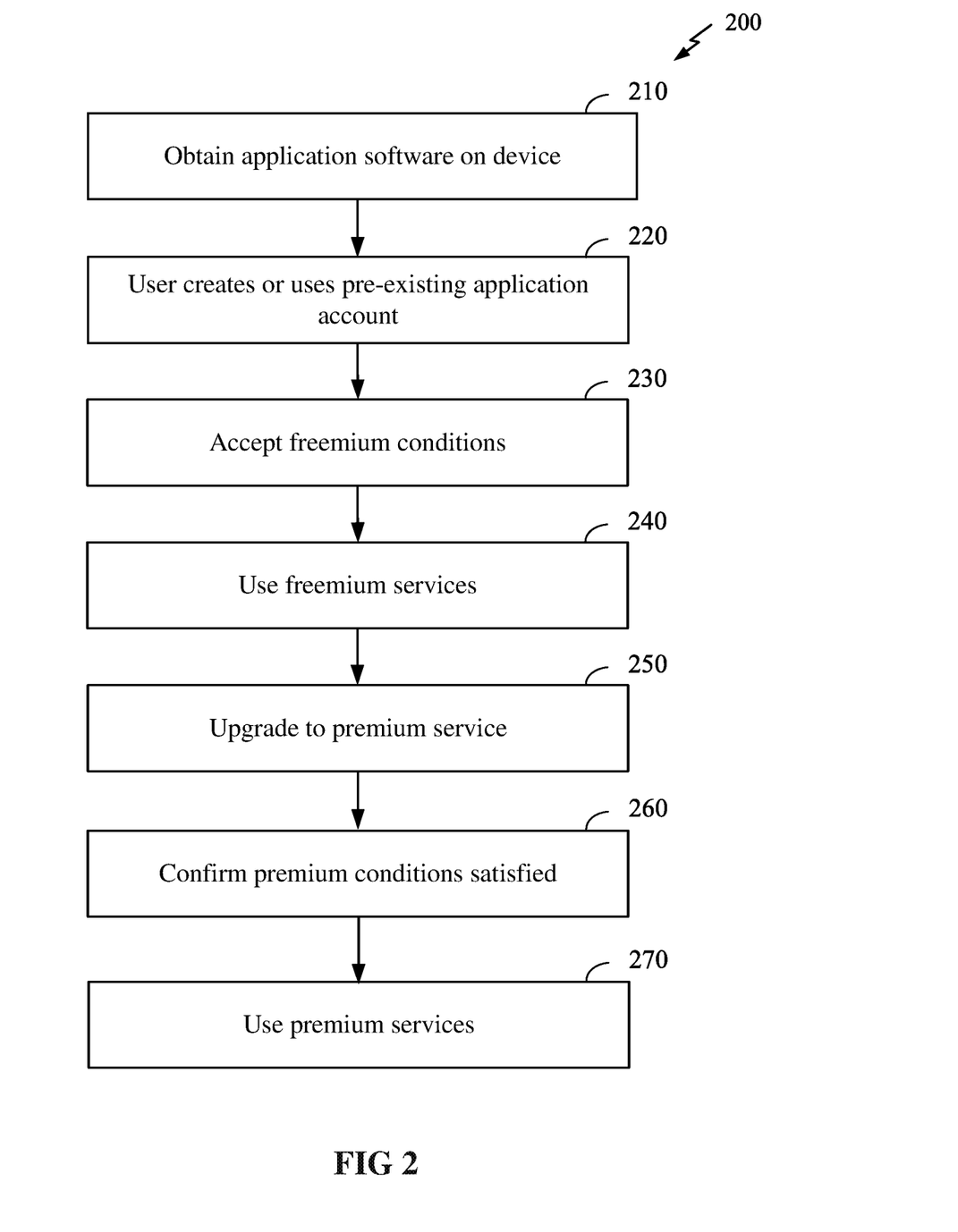
FIG. 2 illustrates an exemplary distribution method for making such freemium and premium services available to a user of an application on a single device.

FIG. 2 illustrates an exemplary distribution method 200 for making such freemium and premium services available to an individual user of an application on a device such as device 111. Note FIG. 2 is shown for illustrative purposes only, and is not meant to limit the scope of the present disclosure.

At block 210, software for executing some or all features of an application may be obtained. For example, the software may be downloaded to the device from the Internet, or installed on the device from other storage media. In an exemplary embodiment, the software may be obtained directly from application server 120, or it may be obtained from other sources.

At block 220, the user is required by server 120 to create or use a pre-existing application account to access features of the application.

At block 230, confirmation may be received by server 120 that the user has agreed to and/or fulfilled the "freemium conditions" to access freemium services using the application account.

At block 240, the user uses the application freemium services, e.g., locally on the device.

At block 250, a user may choose the option to upgrade the service level of the application account to premium service.

At block 260, confirmation may be received by server 120 that the user has agreed to and/or fulfilled the premium conditions to access and use premium services using the application account.

At block 270, the user uses the application premium services.

It will be appreciated that distribution method 200 advantageously allows a user of device 111 to sample certain features of an application free of charge before deciding to purchase premium application services. Furthermore, from the perspective of the application owner, method 200 may promote awareness and widespread adoption of the application by users.

Further described herein is an alternative electronic distribution method for providing application services to multiple users and/or devices belonging to a single organization, such as organization 110 in FIG. 1.

In particular, referring back to FIG. 1, a plurality of devices 112.1, . . . , 112.N (collectively referred to herein as devices 112) are associated with an organizational entity 110, hereinafter organization 110. Any of devices 112 may support similar hardware capabilities as device 111 described hereinabove. Devices 112 may include a homogeneous or heterogeneous collection of device types.

Users of devices 112, and/or any of devices 112 themselves, may belong to or otherwise be affiliated with organization 110. For example, organization 110 may be a company, a school, or any other type of organization. Organization 110 may assign a member ID to each of its members, e.g., member ID's 114.1, . . . , 114.M (collectively denoted member ID's 114). Any of member ID's 114 may identify a user or device within organization 110 to whom or to which application service is to be provided.

In an exemplary embodiment, a member ID may be, e.g., an email address having a format such as "membername@abcentity.com," wherein the domain name (e.g., "abcentity.com") of the email address identifies organization 110, while the username (e.g., "membername") of the email address identifies a specific one of member ID's 114 belonging to organization 110. An organization wherein all members share the same domain name may also be denoted herein as a "tenant."

Figure 3:
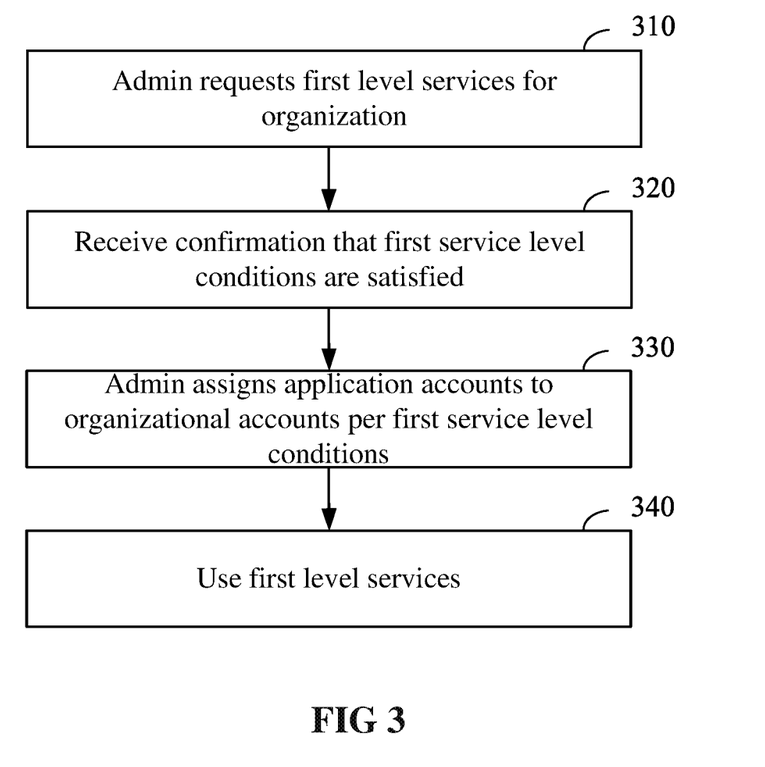
FIG. 3 illustrates an exemplary embodiment of an alternative distribution method for making application services available to users and devices belonging to an organization, such as organization.

FIG. 3 illustrates an exemplary embodiment of an alternative distribution method 300 for making application services available to users and devices belonging to an organization, such as organization 110. Note FIG. 3 is shown for illustrative purposes only, and is not meant to limit the scope of the present disclosure.

At block 310, an administrator (or "admin") of organization 110 may request from application server 120 that a specific application service level, e.g., a first service level or "first level," be provided to a plurality of users and/or devices 112 within organization 110. The admin may correspond to a user empowered by organization 110 to control usage of the application by users and/or devices 112 within organization 110. In an exemplary embodiment, the requested service level may include access to and use of the application by up to a maximum number of users and/or devices within the organization.

At block 320, confirmation is received by server 120 that the service conditions for the requested service level have been fulfilled. For example, the admin may complete payment procedures through application server 120 according to the service conditions as specified by the application owner, and thereby secure the requested service level for users and/or devices within organization 110.

At block 330, server 120 empowers the admin to provision application services to members of organization 110 as prescribed in the service conditions. In particular, server 120 may assign the admin an admin account which is specially granted administrative privileges to control or modify the level of application service provided to members of the corresponding organization. The admin may selectively assign the granted application service to one or more of the member ID's 114 according to the service conditions. In an exemplary embodiment, a given set of service conditions may specify, e.g., a maximum number of member ID's 114 to whom the service level is to be provided. For example, server 120 may maintain a database 126 associated with an organizational admin account, along with a list of application accounts and service levels assigned to the organization.

At block 340, members of organization 110 to whom the application service has been assigned may use the application according to the service level assigned by the admin.

While method 300 enables the distribution of application services at a specific service level to multiple users and/or devices within an organization, it may not be optimized to accommodate freemium or premium services, such as described with reference to method 200 in FIG. 2. For example, the assignment of premium services by the admin at block 330 may need to account for whether any of users 112 are already using freemium services or not, if it is desired to ensure continuous uninterrupted application service for such users. Furthermore, the assignment of services by the admin to users and/or devices may present a challenge for organizations with hundreds or even thousands of members.

Accordingly, it would be desirable to provide novel techniques for electronically distributing application services at different service levels to organizations having multiple users and/or devices.

Figure 4:
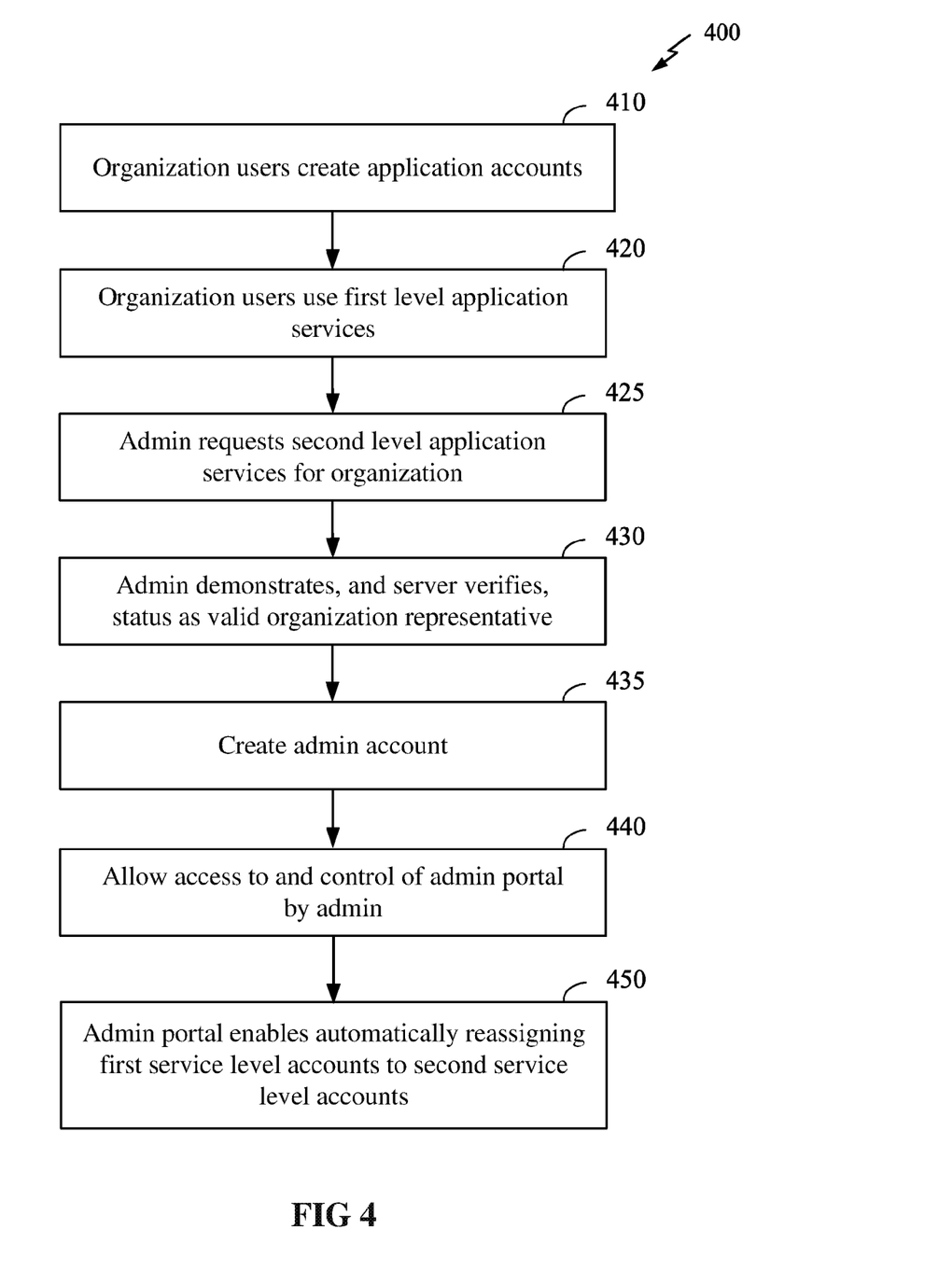
FIG. 4 illustrates an exemplary embodiment of an application distribution method for organizations according to the present disclosure.

FIG. 4 illustrates an exemplary embodiment of an application distribution method 400 for organizations according to the present disclosure. Note FIG. 4 is shown for illustrative purposes only, and is not meant to limit the scope of the present disclosure. Further note that certain aspects of the method may be omitted for ease of discussion, e.g., the initial installation of application software on a device, etc.

In FIG. 4, at block 410, any users (or "organization users") belonging to organization 110 may create respective application accounts with application server 120. In an exemplary embodiment, created application accounts may include at least one freemium account, e.g., as described with reference to blocks 210-240 of FIG. 2. Note organization users may create application accounts independently of each other. For example, a first user belonging to organization 110 may perform blocks 210-240 of method 200 on a first device, while a second user belonging to organization 110 may independently perform blocks 210-240 on a second device, etc.

In an exemplary embodiment, each user may provide his or her member ID (e.g., any of member ID's 114) within organization 110 to server 120, and associate such member ID with the created application account. For example, a user may provide an email address to be associated with the created application account. In an exemplary embodiment, the domain name associated with the email address may be used to identify all users associated with the same organization, assuming that all such users' email addresses would share the same domain name.

At block 420, organization users use first level application services, e.g., freemium services.

At block 425, an administrator (or "admin") for organization 110 requests second level application services, e.g., premium services, from application server 120 on behalf of organization 110. The conditions corresponding to the requested level of application services may specify, e.g., that the admin pays a predetermined fee to enable up to a maximum number of users belonging to organization 110 to use the premium services.

At block 430, the admin demonstrates, and server 120 verifies, the status of the admin as a valid representative of organization 110. In an exemplary embodiment, such representative status may be demonstrated by, e.g., providing evidence of ownership of a network domain of organization 110.

For example, the admin may enter a TXT record from the domain registrar to prove domain ownership. Application server 120 may verify the TXT record against records of the domain registrar; if the record is verified, then an admin account may be assigned to the admin by server 120. In an alternative exemplary embodiment, an admin may prove domain ownership by demonstrating to server 120 an ability to modify the DNS records of a specific domain, or an organization's web page, in a requested fashion. An admin may alternatively prove domain ownership by, e.g., submitting other documentation of ownership to server 120.

At block 435, an admin account is assigned to the admin upon verification of organizational representative status and fulfillment of service conditions.

At block 440, server 120 grants the admin account access to an admin portal to control the service levels assigned to application accounts associated with organization 110. In an exemplary embodiment, the admin portal may correspond to an interface, e.g., Webpage, provided by server 120 for use by the admin to control application services internally within the organization.

For example, the admin may log into the admin portal, e.g., using the admin account assigned by application server 120 to organization 110. The admin portal may allow the admin to assign the application accounts to specific member ID's 114 within organization 110, as per the service conditions as described with reference to block 425.

In an exemplary embodiment, the application accounts may be assigned to member ID's 114 associated with organization 110. For example, each of member ID's 114 may be granted access to premium services by the admin.

At block 450, the admin portal may enable the admin to automatically reassign first service level accounts to second service level accounts. For example, such automatic reassignment may include upgrading existing freemium accounts in the organization to premium accounts.

Figure 5:
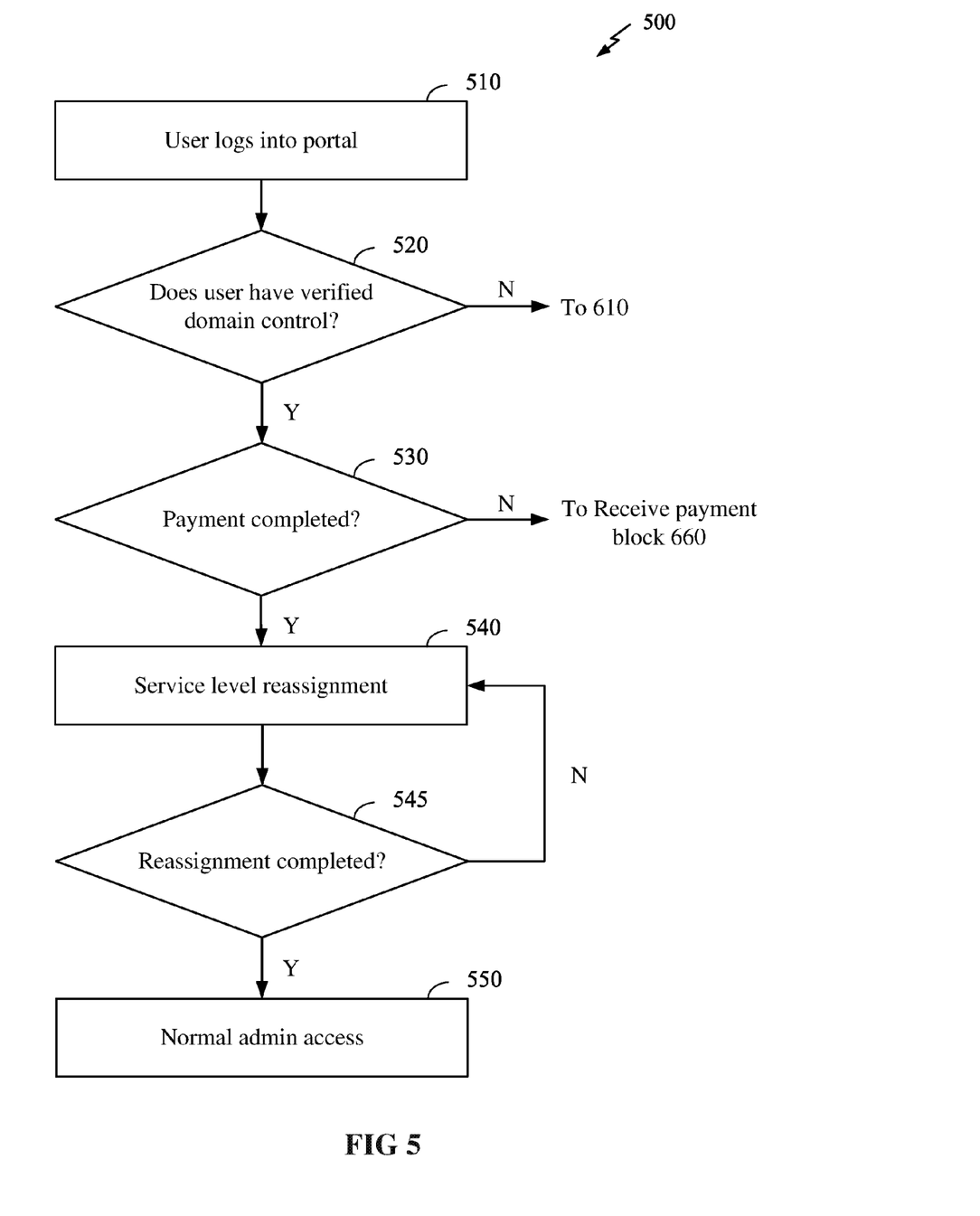
FIG. 5 illustrates an exemplary embodiment of a method that may be executed by application server to implement aspects of application service assignment for organizations according to the present disclosure.

FIG. 5 illustrates an exemplary embodiment of a method 500 that may be executed by application server 120 to implement aspects of application service assignment for organizations according to the present disclosure.

In FIG. 5, at block 510, server 120 processes a log-in from a user to an application portal associated with organization 110.

At block 520, server 120 verifies whether the user logged in at block 510 possesses control of a network domain of organization 110. If yes, method 500 proceeds to block 530. If no, method 500 proceeds to block 610 of FIG. 6, further described hereinbelow.

In an exemplary embodiment, by default, when a user logs into the application portal, an "admin" tile may be presented through the portal interface offering any user the option to attempt to access the portal as an organizational admin. If the user clicks such an admin tile, then server 120 may verify whether the user possess control, as described with reference to block 520.

Figure 6:
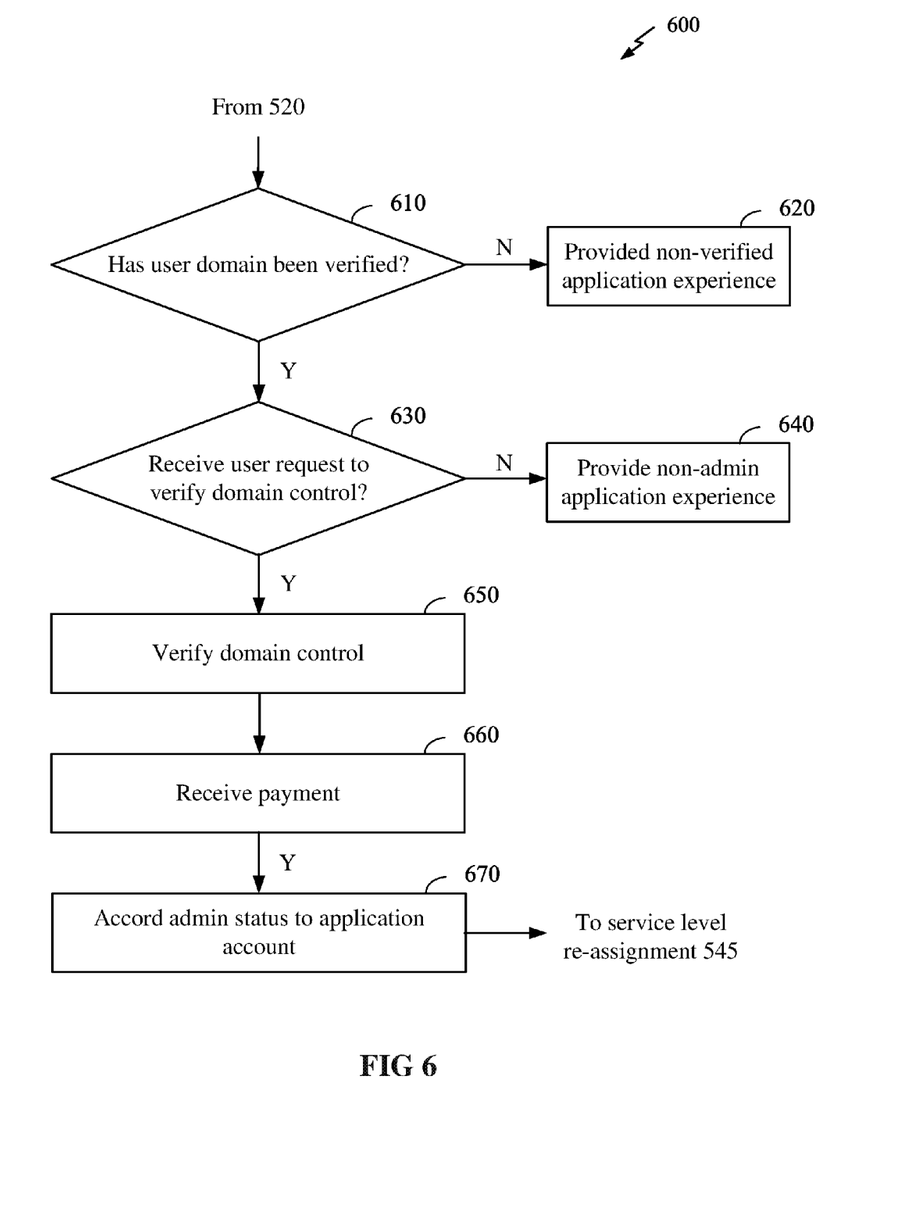
FIG. 6 illustrates further aspects of a method described herein.

At block 530, server 120 verifies that the requisite payment has been completed for a level of application service requested by the user. If yes, method 500 proceeds to block 540. If no, method 500 proceeds to block 660 to receive payment.

At block 540, server 120 may perform service level reassignment. This refers to the process of converting application accounts associated with organization 110 from a pre-existing level of service to a new, upgraded level of service. For example, license reassignment may include converting freemium accounts to premium accounts. Such license reassignment may be performed automatically after block 530, or upon request by the admin. In an exemplary embodiment, license reassignment may comprise executing a software routine comprising a batch call to assign the new, upgraded service level to a plurality of accounts associated with the organizational entity.

At block 545, it is checked whether license reassignment has been completed for all application accounts associated with organization 110. If no, then method 500 returns to block 540 to continue license reassignment. If yes, then method 500 proceeds to block 550.

At block 550, normal administrative access is granted to the admin. For example, the admin may be granted access to the admin portal by server 120. In an exemplary embodiment, any other attempt to access the admin portal at any block prior to block 550 may be denied or "blocked" by server 120. In an exemplary embodiment, if it is detected that organization 110 has education offerings (e.g., is a university or other academic institution), or has no users already assigned to the first service level, then access to the admin portal need not be blocked prior to block 550.

FIG. 6 illustrates further aspects of method 500 described hereinabove.

At block 610, it is checked whether the domain of the user logged into the portal at 510 has been verified. If no, then a non-verified application experience may be provided to the user at block 620. If yes, then method 500 may proceed to block 630. In particular, a non-verified application experience may include, e.g., a subset of features of a verified application experience.

In an exemplary embodiment, verification of a user's domain may include, e.g., verifying that an email address provided by the user is valid. For example, a confirmation email may be sent to such email address, and the user's domain may be considered verified if the user subsequently takes some action in response to receiving the email, e.g., clicks on a confirmation link in the email or enters some confirmation code provided in the email.

At block 630, it is checked whether the user has requested to have the user's control of the domain of organization 120 be verified by server 120. If no, then a non-admin application experience may be provided to the user at block 640. If yes, then method 500 may proceed to block 650.

In particular, a non-admin experience may correspond to, e.g., use of premium application services such as described hereinabove with reference to FIG. 2.

At block 650, the user's domain control is verified, and admin status is accorded the verified user.

At block 660, payment is received from the admin for application services requested for organization 110.

In an exemplary embodiment, server 120 may determine a recommended payment to be received from the admin based on the number of application accounts already assigned to organization 110. For example, if two hundred users in organization 110 have already created application accounts with server 120, and are using the application at a first service level (e.g., freemium service), then server 120 may recommend a payment or payment plan to the admin that provides the second service level (e.g., premium service) to at least two hundred users. The recommendation may be dynamically generated by server 120, e.g., by enumerating a total number of application accounts already assigned to organization 110.

In an exemplary embodiment, the admin portal may display a shopping cart icon, with the recommended payment or payment plan to the admin.

At block 670, the verified user account is given the status of an "admin account," and admin services are provided to the user. In an exemplary embodiment, admin services may include providing access to a user to the admin portal associated with organization 120. Admin services may or may not also include premium application services for the admin account.

Following block 670, method 500 proceeds to block 540, as earlier described hereinabove with reference to FIG. 5.

In an exemplary embodiment, if method 500 is prematurely aborted at any block, then following user log-in at block 510, method 500 may jump directly to, and resume at, the last completed block. For example, if domain control has been verified at block 650, but payment not yet received at block 660 due to connection error, etc., then method 500 may take user to block 660 directly upon the user's next log-in at block 510. Such exemplary embodiments are contemplated to be within the scope of the present disclosure.

Figure 7:
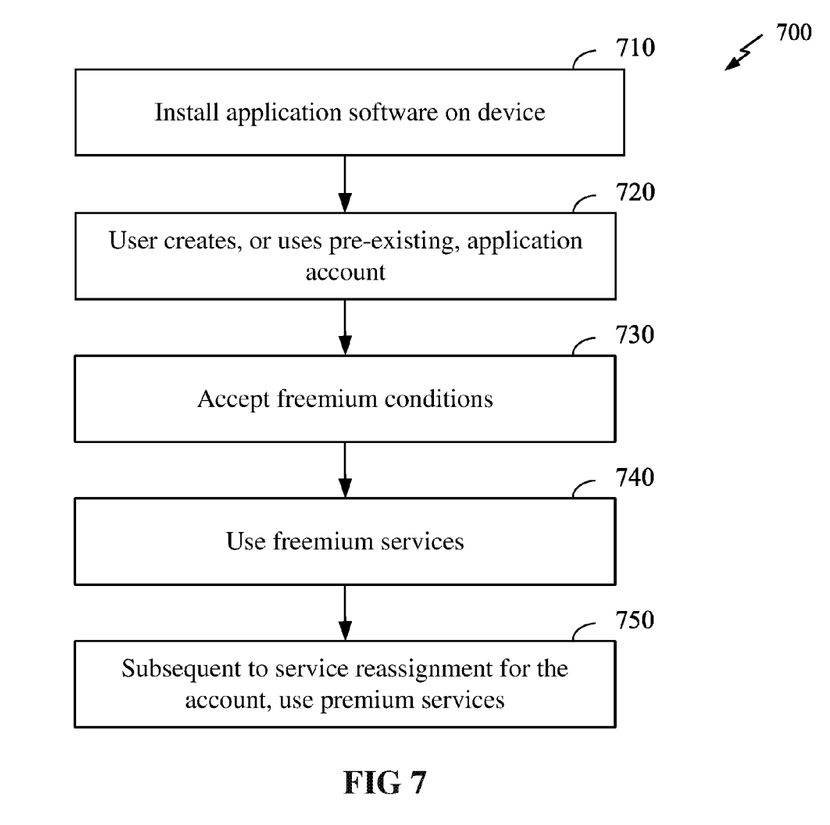
FIG. 7 illustrates an alternative exemplary application distribution method for making freemium and premium services available to a user of an application on a device, wherein the user or device is associated with an organization.

FIG. 7 illustrates an alternative exemplary application distribution method 700 for making freemium and premium services available to a user of an application on a device, wherein the user or device is associated with an organization, e.g., organization 110. Note FIG. 7 is shown for illustrative purposes only, and is not meant to limit the scope of the present disclosure.

In FIG. 7, at block 710, software for executing some or all features of an application locally on the device may be installed. For example, the software may be downloaded from the Internet, or installed from other storage media.

At block 720, application server 120 may require the user to create (or use a pre-existing) application-specific account (or "application account") to access certain features of the downloaded application.

At block 730, confirmation may be received by server 120 that the user has accepted certain terms, or "freemium conditions," to access application freemium services using the corresponding application account.

At block 740, the user uses the freemium services locally on the device.

At block 750, subsequent to service reassignment for the user's application account, the user uses premium services locally on the device. In an exemplary embodiment, the service reassignment may correspond to, e.g., completion of block 540 in method 500 for the user's application account. Note from the user's perspective, the transition to block 740 to block 750 may be performed "seamlessly," e.g., previously saved user data and/or settings may be preserved in transitioning from using freemium services to premium services on the data.

Figure 8:
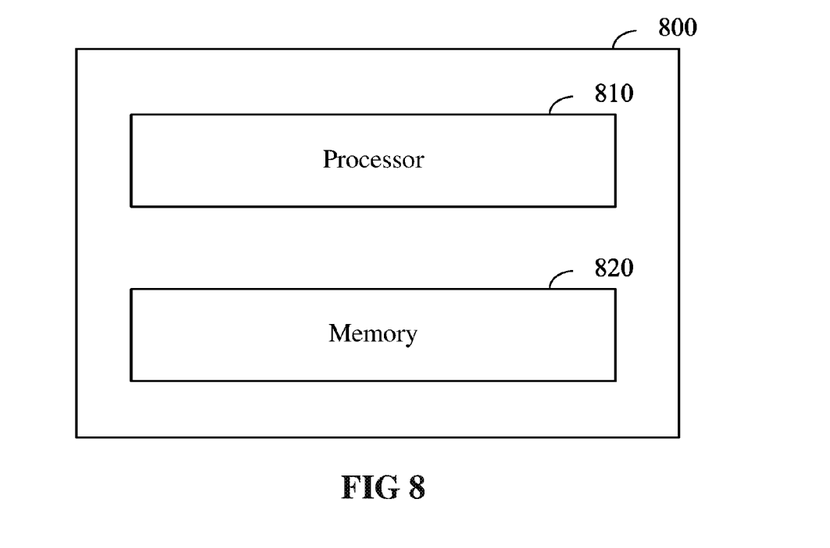
FIG. 8 illustrates an exemplary embodiment of a computing device according to the present disclosure.

FIG. 8 illustrates an exemplary embodiment of a computing device 800 according to the present disclosure. Note device 800 is shown for illustrative purposes only, and is not meant to limit the scope of the present disclosure.

In FIG. 8, device 800 includes a processor 810; and a memory 820 holding instructions executable by the processor to: identify one or more application accounts associated with an organizational entity, at least one of the application accounts being associated with a first service level; electronically verify that an admin account controls a network domain associated with the organizational entity; in response to the admin account being determined to control the network domain, electronically verify fulfillment of service conditions associated with a second service level; in response to the service conditions being determined as fulfilled, electronically assign the second service level to each of the identified one or more accounts associated with the organizational entity.

Figure 9:
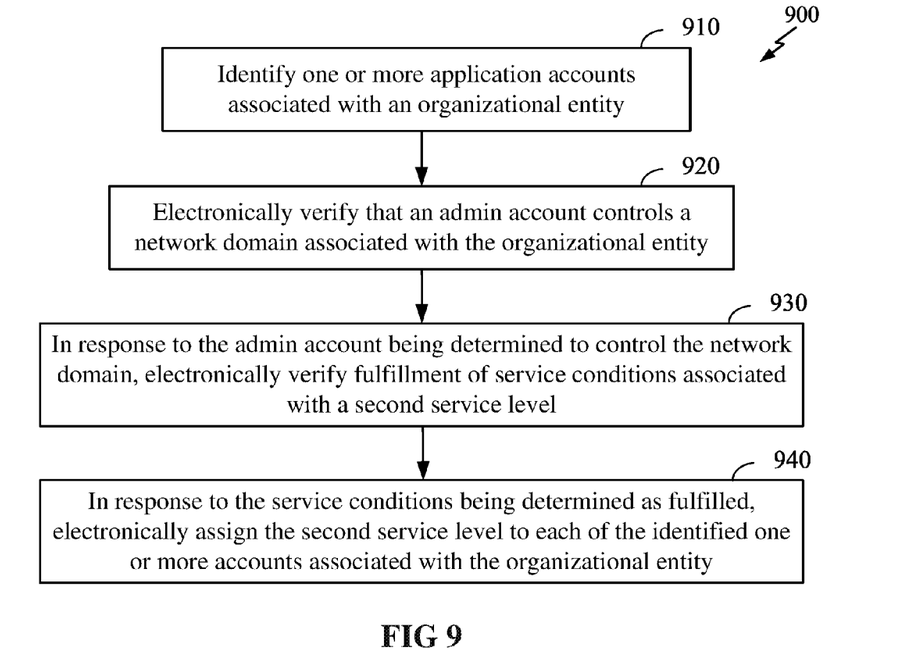
FIG. 9 illustrates an exemplary embodiment of a method according to the present disclosure.

FIG. 9 illustrates an exemplary embodiment of a method 900 according to the present disclosure. Note method 900 is shown for illustrative purposes only, and is not meant to limit the scope of the present disclosure.

In FIG. 9, at block 910, one or more application accounts associated with an organizational entity is identified. At least one of the application accounts may be associated with a first service level.

At block 920, it is electronically verified that an admin account controls a network domain associated with the organizational entity.

At block 930, in response to the admin account being determined to control the network domain, fulfillment of service conditions associated with a second service level are electronically verified.

At block 940, in response to the service conditions being determined as fulfilled, the second service level is electronically assigned to each of the identified one or more accounts associated with the organizational entity.

Figure 10:
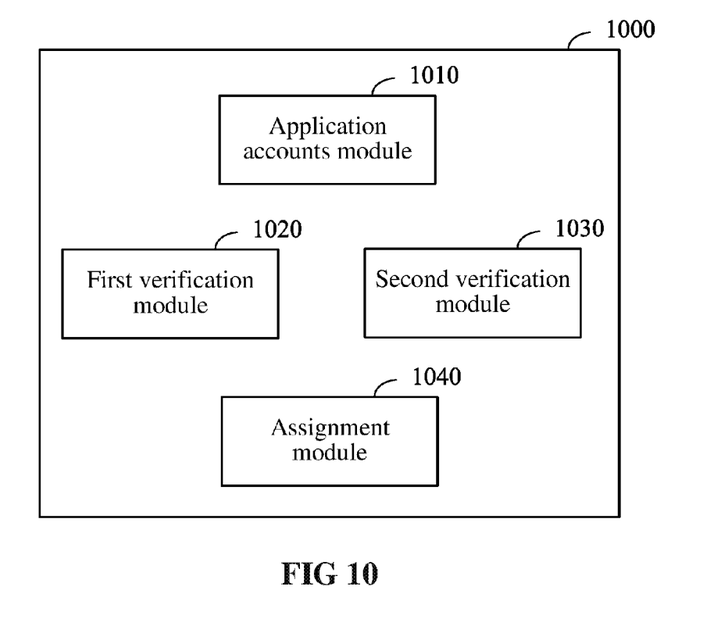
FIG. 10 illustrates an exemplary embodiment of an apparatus according to the present disclosure.

FIG. 10 illustrates an exemplary embodiment of an apparatus 1000 according to the present disclosure. Note apparatus 1000 is shown for illustrative purposes only, and is not meant to limit the scope of the present disclosure.

In FIG. 10, apparatus 1000 includes an application accounts module 1010 configured to identify one or more application accounts associated with an organizational entity, at least one of the application accounts being associated with a first service level; a first verification module 1020 configured to electronically verify that an admin account controls a network domain associated with the organizational entity; a second verification module 1030 configured to, in response to the admin account being determined to control the network domain, electronically verify fulfillment of service conditions associated with a second service level; and an assignment module 1040 configured to, in response to the service conditions being determined as fulfilled, electronically assign the second service level to each of the identified one or more accounts associated with the organizational entity.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present. Furthermore, when an element is referred to as being "electrically coupled" to another element, it denotes that a path of low resistance is present between such elements, while when an element is referred to as being simply "coupled" to another element, there may or may not be a path of low resistance between such elements.

The functionality described herein can be performed, at least in part, by one or more hardware and/or software logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

The invention claimed is:

1. A method for electronic distribution of computer applications having multiple service levels, the method comprising, using instructions stored on a storage unit coupled to a central processing unit (CPU):
   identifying, by the CPU, one or more application accounts associated with an organizational entity, at least one of the application accounts being associated with a first service level;
   electronically verifying that an admin account controls a network domain associated with the organizational entity;
   in response to the admin account being determined to control the network domain, electronically verifying fulfillment of service conditions associated with a second service level;
   in response to the service conditions being determined as fulfilled, electronically assigning the second service level to each of the identified one or more accounts associated with the organizational entity.

2. The method of claim 1, the electronically assigning the second service level comprising executing a software routine comprising a batch call to assign the second service level to a plurality of accounts associated with the organizational entity.

3. The method of claim 1, further comprising, in response to the service conditions being determined as fulfilled, granting the admin account electronic access to an administrative portal for provisioning application services to members of the organizational entity.

4. The method of claim 3, the administrative portal comprising a web page interface accessible over the Internet for selectively provisioning the second service level to one or more members of the organizational entity.

5. The method of claim 1, the electronically verifying control comprising verifying a TXT record entered from the admin account against records provided by the domain registrar of the network domain.

6. The method of claim 1, the electronically verifying control comprising: transmitting a request to the admin account that a modification be made to DNS records associated with the network domain; and determining that the requested modification to the DNS records is executed.

7. The method of claim 1, the electronically verifying control comprising: transmitting a request to the admin account that a modification be made to a web page associated with the network domain; and determining that the requested modification to the web page is executed.

8. The method of claim 1, the electronically verifying fulfillment comprising electronically verifying payment of a predetermined fee for the second service level.

9. The method of claim 1, the first service level comprising freemium service, the second service level comprising premium service.

10. The method of claim 1, each of the one or more application accounts being associated with an email address, a network domain of the email address corresponding the network domain associated with the organizational entity.

11. The method of claim 1, at least one of the one or more application accounts being associated with a device, and at least one of the one or more application accounts being associated with a human member of the organizational entity.

12. A server device apparatus for electronic distribution of computer applications having multiple service levels, the apparatus comprising:
- an application accounts processor on the server device configured to identify one or more application accounts associated with an organizational entity, at least one of the application accounts being associated with a first service level;
- a first verification processor on the server device configured to electronically verify that an admin account controls a network domain associated with the organizational entity;
- a second verification processor on the server device configured to, in response to the admin account being determined to control the network domain, electronically verify fulfillment of service conditions associated with a second service level; and
- an assignment processor on the server device configured to, in response to the service conditions being determined as fulfilled, electronically assign the second service level to each of the identified one or more accounts associated with the organizational entity.

13. The apparatus of claim 12, the assignment processor configured to execute a software routine comprising a batch call to assign the second service level to a plurality of accounts associated with the organizational entity.

14. The apparatus of claim 12, further comprising a portal processor configured to, in response to the service conditions being determined as fulfilled, grant the admin account electronic access to an administrative portal for provisioning application services to members of the organizational entity.

15. The apparatus of claim 14, the administrative portal comprising a web page interface accessible over the Internet for selectively provisioning the second service level to one or more members of the organizational entity.

16. The apparatus of claim 12, the first verification processor configured to verify a TXT record entered from the admin account against records provided by the domain registrar of the network domain.

17. A computing device comprising:
- a processor; and
- a memory holding instructions executable by the processor to:
- identify one or more application accounts associated with an organizational entity, at least one of the application accounts being associated with a first service level;
- electronically verify that an admin account controls a network domain associated with the organizational entity;
- in response to the admin account being determined to control the network domain, electronically verify fulfillment of service conditions associated with a second service level;
- in response to the service conditions being determined as fulfilled, electronically assign the second service level to each of the identified one or more accounts associated with the organizational entity.

18. The device of claim 17, the instructions executable by the processor to electronically assign the second service level comprising instructions executable by the processor to execute a software routine comprising a batch call to assign the second service level to a plurality of accounts associated with the organizational entity.

19. The device of claim 17, the memory further storing instructions executable by the processor to, in response to the service conditions being determined as fulfilled, grant electronic access to the admin account to an administrative portal for provisioning application services to members of the organizational entity.

20. The device of claim 19, the administrative portal comprising a web page interface accessible over the Internet for selectively provisioning the second service level to one or more members of the organizational entity.

* * * * *